United States Patent
Magnusson et al.

(10) Patent No.: US 8,904,035 B2
(45) Date of Patent: Dec. 2, 2014

(54) ADDRESS MANAGEMENT IN MOBILE IP ENVIRONMENTS

(75) Inventors: Per Olof Magnus Magnusson, Linköping (SE); Joachim Sachs, Aachen (DE); Marc Vorwerk, Köln (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1595 days.

(21) Appl. No.: 10/597,960

(22) PCT Filed: Feb. 16, 2004

(86) PCT No.: PCT/EP2004/001434
§ 371 (c)(1),
(2), (4) Date: Feb. 23, 2007

(87) PCT Pub. No.: WO2005/079034
PCT Pub. Date: Aug. 25, 2005

(65) Prior Publication Data
US 2007/0156866 A1     Jul. 5, 2007

(51) Int. Cl.
  *G06F 15/16*     (2006.01)
  *G06F 15/173*    (2006.01)
  *H04L 12/701*    (2013.01)
  *H04W 40/00*     (2009.01)
  *H04W 8/26*      (2009.01)
  *H04L 29/06*     (2006.01)
  *H04W 80/04*     (2009.01)

(52) U.S. Cl.
  CPC .............. *H04W 40/00* (2013.01); *H04L 69/14* (2013.01); *H04W 80/04* (2013.01); *H04L 45/00* (2013.01); *H04W 8/26* (2013.01)
  USPC ........................ 709/238; 709/230; 709/239

(58) Field of Classification Search
  USPC .......................................... 709/238, 230, 239
  See application file for complete search history.

(56) References Cited

U.S. PATENT DOCUMENTS

| | | | | |
|---|---|---|---|---|
| 5,361,363 A | * | 11/1994 | Wells et al. ................... | 712/22 |
| 5,708,655 A | * | 1/1998 | Toth et al. .................... | 370/313 |
| 6,766,165 B2 | * | 7/2004 | Sharma et al. ................ | 455/423 |
| 2002/0161927 A1 | * | 10/2002 | Inoue et al. .................. | 709/245 |
| 2003/0153325 A1 | * | 8/2003 | Veerepalli et al. ............ | 455/453 |
| 2003/0236914 A1 | * | 12/2003 | Liu ............................... | 709/245 |
| 2004/0005886 A1 | * | 1/2004 | Oda et al. ..................... | 455/422.1 |

FOREIGN PATENT DOCUMENTS

| | | |
|---|---|---|
| WO | WO 03/047183 A | 6/2003 |
| WO | WO 03/047183 A1 * | 6/2003 |

OTHER PUBLICATIONS

C. Perkins, Ed, "IP Mobility Support for IPv4", Nokia Research Center, Jan. 2002, The Intertnet Society.
El Malki, et al "Simultaneous Bindings for Mobile IPv6 Fast Handovers", Oct. 2003.

(Continued)

*Primary Examiner* — Rupal Dharia
*Assistant Examiner* — Joe Chacko

(57) ABSTRACT

A data unit processing entity (4) is described, which has a decision part (41) for setting a forwarding address FA on the basis of an identifying address in a received data unit, by referring to decision data stored in a decision data memory (42). A management part (43) is provided, which is arranged to provide a network control function (51) with access to the decision data in the decision data memory (42), in order to change said decision data, independently of any access given to mobile nodes.

14 Claims, 7 Drawing Sheets

(56) References Cited

OTHER PUBLICATIONS

D. Johnson, et al, "Mobility Support in IPv6", Jun. 2004, The Internet Society.
Hesham Soliman, et al, "Per-flow movement in MIPv6", Nov. 2001.
R. Price, et al, "Signaling Compression (SigComp)", Jan. 2003, The Internet Society.

Johnson, et al.: "Mobility Support in IPv6". Draft-ietf-mobileip-ipv6-24.txt. IETF Mobile IP Working Group, Internet-Draft. Jun. 30, 2003.
Kuladinithi, et al.: "Filters for Mobile IPv6 Bindings (NOMADv6)". draft-nomadv6-mobileip-filters-01.txt. MIP6 Working Group, Internet Draft. Oct. 2003.

* cited by examiner

ADDRESS MANAGEMENT IN MOBILE IP ENVIRONMENTS

BACKGROUND

The present application relates to a data unit processing entity in a data unit transmission network and to a control method for such a data unit processing entity.

In the field of data communication, it is known to provide data unit transmission networks. Data that needs to be transported over such a data unit transmission network is divided into individual data units, and each data unit carries a routing address that is used by network nodes for sending the data unit to its intended destination. The handling of such data units is typically performed in accordance with an appropriate protocol, e.g. the Internet Protocol (IP). It is noted that such data units may carry different names in the context of different protocols, such as packet, protocol data unit, segment, frame, etc. In the present description and claims, the term "data unit" is used generically to describe any such fragment of data that is being transported over an appropriate network.

If all network nodes of a data unit transmission network are immobile and are always connected to the overall network via the same links, then there is no problem in routing data units to intended receiving nodes, because the routing address serves both to identify and to locate the receiving node. However, the situation becomes more complicated if at least some nodes that can access the data unit transmission network over more than one link. For example, a node could be capable of moving and of accessing the network over various links depending on location. Such a node capable of accessing the network over more than one link will therefore be referred to as a mobile node in the present description and claims. However, it is to be noted that the term "mobile node" relates to any node capable of accessing the network over more than one link, regardless of whether the node is in fact physically mobile. In other words, the term "mobile node" also covers nodes that are neither physical mobile nor moving, as long as they are capable of accessing via more than one link. As an example, a mobile node could therefore be a stationary computer that is equipped with a wire line LAN connection, a wireless LAN capability and a GPRS radio capability, such that it could access a network (e.g. the Internet) over these three different links.

The situation of nodes that can access a network over more than one link requires additional routing capabilities.

In connection with work on expanding the capabilities of the Internet protocol, request for comments 3220 that relates to version 4 of the Internet Protocol (IPv4) describes the use of two types of routing addresses, a so-called home address for identifying a node and a so-called care-of address for forwarding of data units to mobile nodes. The home address (HoA) is an example of the general concept of an identifying address (IA), and the care-of address (CoA) is an example of the general concept of a forwarding address (FA).

The term "mobile node" therefore refers to such that nodes that can have a plurality of forwarding addresses simultaneously.

In a generalised network operating in accordance with an appropriate routing protocol (RP), the network nodes are arranged to distinguish between the IAs and the FAs in a data unit to be forwarded. It is noted that the term "routing protocol" (RP) as used in the present description and claims is generic to describe any protocol suitable for allowing the routing of data units over a plurality of network nodes. IP is an example of such a general routing protocol.

In a data unit transmission network that uses identifying addresses and forwarding addresses, one may provide special data unit processing entities or agents that perform a decision operation for determining a forwarding address on the basis of an identification address. It is noted that the term "entity" or "agent" as used in the present specification and claims refers to a functional element that is capable of performing a certain function. An entity or element may be located in a single place, e.g. in a node, but it can also be distributed over several locations, e.g. several nodes or other network elements.

The data unit processing entity of this type comprises a decision part for setting a forwarding address in a received data unit depending on the identification address set in the received data unit, by accessing a memory that contains decision data, where the decision data comprises one or more forwarding addresses associated with identification address. As an example, in the present proposals for developing IP, i.e. for version 6 (IPv6), the use of a so-called home agent is proposed. A home agent receives data units that contain the home address (i.e. the identifying address), and on the basis of rules and parameters stored in a so-called binding cache performs a so-called binding operation, i.e. determines the care-of address for the given home address. In the present discussion of further developing IP networks using mobile nodes, i.e. in the discussion for Mobile Ipv6 (MIPv6), it is considered that the mobile node can have multiple care-of addresses. It can re-route between different care-of addresses by indicating to appropriate agents in the network which care-of address to use.

The method of managing the decision data is performed by letting the mobile node send so-called binding updates to the home agent or to the so-called corresponding nodes. A corresponding node is a node with which the mobile node is in communication, and in the course of this communication, the mobile node can simply indicate to the corresponding node, which care-of address to use. The basic principle is that the home agent and corresponding nodes can only have one care-of address listed in the binding cache. It is the mobile node that decides to which care-of address data is directed that is destined for the home address (via the home agent), and it can determine for each corresponding node to which care-of address the corresponding node should send. The principle therefore is that each home agent or corresponding node only has one of the possible care-of addresses indicated in its binding cache.

In connection with mobile Ipv6 a system called NOMADv6 has been proposed, which comprises filters for mobile Ipv6 bindings. NOMAD allows a mobile node that has a plurality of care-of addresses to register multiple binding updates at any appropriate binding agent (e.g. home agent, correspondent node or a so-called mobility anchor point) and associate these different bindings with a filter. The filter allows to direct different flows to different care-of addresses based on the Traffic Class field in the IPv6 header, the Flow Label field in the IPv6 header, the Protocol Extension field in the IPv6 header, which identifies the type of higher layer protocol being used, the Source Address (or source address prefix), a range of Source Port or Destination Port numbers in the protocol header, or the value of a certain data region within the IPv6 packet.

A further concept known in connection with mobile IPv6 is the use of bicasting, i.e. of allowing a home agent to temporarily have bindings to two care-of addresses for the same home address. While such bindings are simultaneously active, every packet is replicated and a copy is sent to each care-of address.

OBJECT OF THE INVENTION

The object of the invention is to further improve the capabilities of a system that uses identifying addresses and forwarding addresses.

SUMMARY

In accordance with the present invention, the data unit processing entity contains a management part that provides a network control function with access to the decision data memory independently of any access provided to one or more mobile nodes. Typically, the management part will also provide an interface to the decision data for mobile nodes, but this is not necessary. In other words, the decision data that is used by a decision part of the data unit processing entity for selecting a forwarding address on the basis of an identifying address contained in a data unit, can be changed by a network control function independently of the changes that may be performed by or at the request of any mobile nodes.

This concept provides great advantages. It allows the combination of mobility management at the level of the routing protocol (RP) of the data unit transmission network with network control operations that take into account parameters and requirements used in the overall network management. For example, if the mobile nodes connect to the data unit transmission network over a variety of radio links, then the management of radio links can be brought into association with the mobility management performed by the data unit processing entity that determines a forwarding address on the basis of an identifying address. In other words, aspects of radio link management, such as utilization, over-loading, congestion etc. can be taken into account by a network control function that in turn has access to the decision data memory of the data unit processing entity, in order to appropriately update the decision data. For example, it is possible that while a mobile node has indicated to the data unit processing entity that it wishes to receive data units over a forwarding address that is associated with one radio link of a plurality of available radio links, the network control function may override that request by writing a different forwarding address into the decision data, e.g. because the radio link associated with the forwarding address selected by the mobile node is overloaded while another available radio link is under-utilized. With the concept of the present invention, it is especially possible to perform a network controlled handover procedure for a given mobile node, i.e. a handover procedure in which the network initiates the handover and/or decides on the initial and final communication links.

According to a preferred embodiment of the invention, the management part provides independent access to the decision data for a plurality of control functions. This has the particular advantage of a decentralized control over the management of the decision data, and consequently over the decision procedure itself. All of the various control functions have at least partial access to the decision data, such that each of the control functions is involved in the control process for setting forwarding addresses. This provides great flexibility and many new degrees of freedom in overall data unit handling in comparison with a centralized system like in the prior art, in which only one control function controls the decision data.

BRIEF DESCRIPTION OF THE SEVERAL VIEWS OF THE DRAWINGS

In the following, the present invention will be described by referring to specific detailed embodiments which are not intended to be limiting, and by reference to figures, where.

DETAILED DESCRIPTION

In the following description and detailed embodiments, reference will sometimes be made to the Internet Protocol (IP) and presently discussed modifications thereof, such as IP version 6 (IPv6) and Mobile IPv6 (MIPv6). The Internet Protocol and its modifications are a preferred application of the concepts of the present invention, but the present invention is by no means restricted to IP or its modifications, or even to network layer protocols in general. Much rather, the present invention can be applied in the context of any data unit transmission network that uses identifying addresses and forwarding addresses. For example, the invention can also be applied in the context of MPLS (Multi Protocol Label Switching), which is a protocol situated below IP, i.e. below the network layer, but in effect above the link layer.

Figure 1:
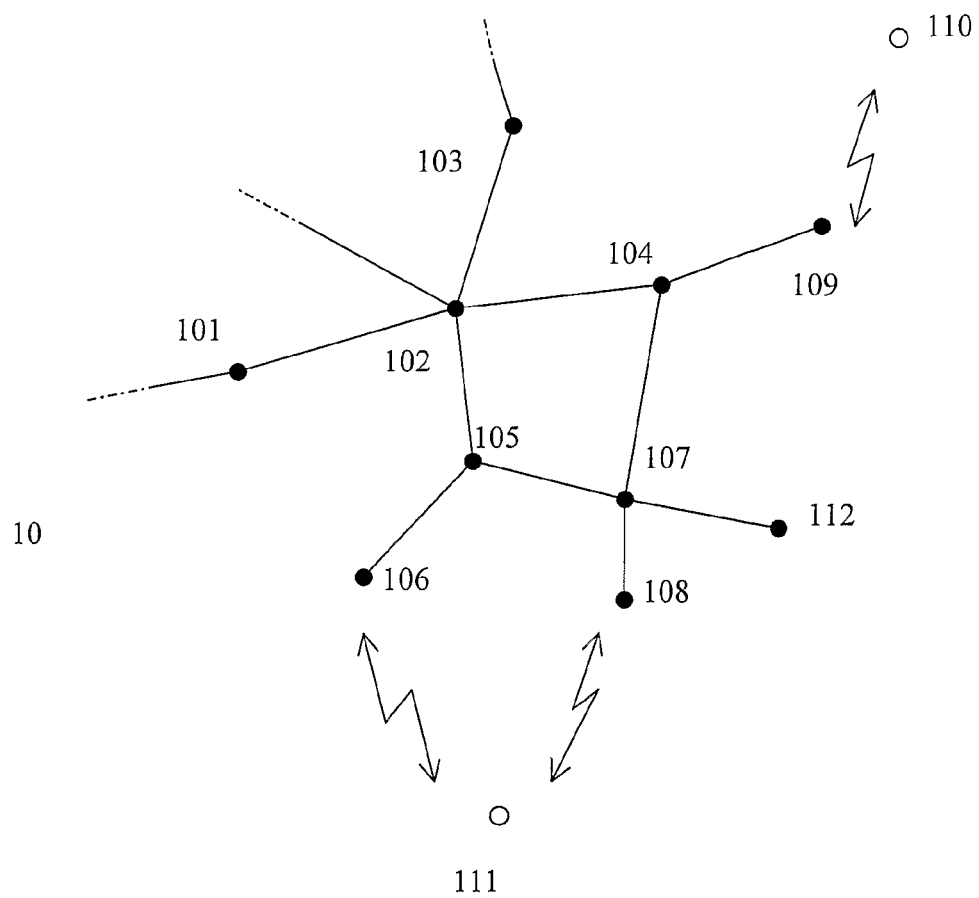
FIG. 1 shows a schematic representation of a data unit transmission network comprising a plurality of nodes.

FIG. 1 shows a schematic representation of a data unit transmission network 10 that comprises network nodes 101-112. Among these network nodes there are routing nodes 101-109, which are arranged to route data units over the data unit transmission network 10 in accordance with an appropriate routing protocol that will generically be abbreviated as RP. As indicated above, the routing protocol RP may be any appropriate network layer protocol, such as IP or a modification of IP, but may also be a routing protocol that is situated at a different layer, such as MPLS.

The network 10 furthermore comprises end nodes 110, 111 and 112, i.e. nodes that are terminals of the network. Nodes 110 and 111 are mobile nodes, which communicate with appropriate access nodes 106, 108 or 109 in wireless fashion. On the other hand, end node 112 is a fixed node that is fixedly connected to node 107, e.g. by one fixed wire-line link. It is again noted that the present invention is not restricted to any specific type of mobile node. As such, the mobile nodes can access the data unit transmission network in any way suitable for communication over a plurality of access links, e.g. radio, infrared or even by (possibly movable) wire-line connections.

For example, it is possible that a mobile node can access the data unit transmission network over a first type mobile phone connection (e.g. via GSM), a second type mobile phone connection (e.g. via UMTS) and a wireless local area network (W-LAN). Each of these different access possibilities is then associated with its own forwarding address, although the mobile node only has one identifying address. Typically, the individual forwarding addresses will also be associated with their own access node, e.g. when considering the example of FIG. 1, network node 108 will handle data units carrying a first forwarding address for mobile node 111, while access node 106 will handle data units carrying a different forwarding address for mobile node 111.

The network nodes 101-112 are capable of distinguishing between an identifying address IA and a forwarding address FA in data units that are being transmitted over network 10. This can be achieved in any suitable or desirable way, e.g. by providing for a specific structure of the data units, such that the identifying address and the forwarding address are to be found at respectively designated fields of the data units. This shall be explained with the examples of FIGS. 2 and 3.

Figure 2:
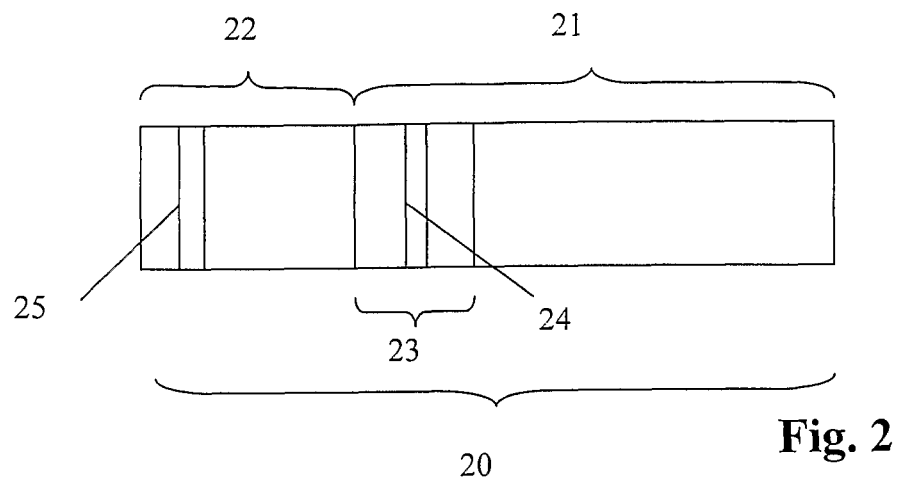
FIG. 2 shows a schematic representation of a data unit carrying an identifying address and a forwarding address.

FIG. 2 schematically shows a data unit 20 that consists of a basic data unit 21 that has its own header 23. For example, this basic data unit 21 can be a standard IP packet, where header 23 contains a field 24 for the standard IP address. In this case, the standard IP address is the identifying address. In accordance with the routing protocol RP employed, an additional header 22 can be added, which comprises a designated field 25 for a forwarding address.

Figure 3:
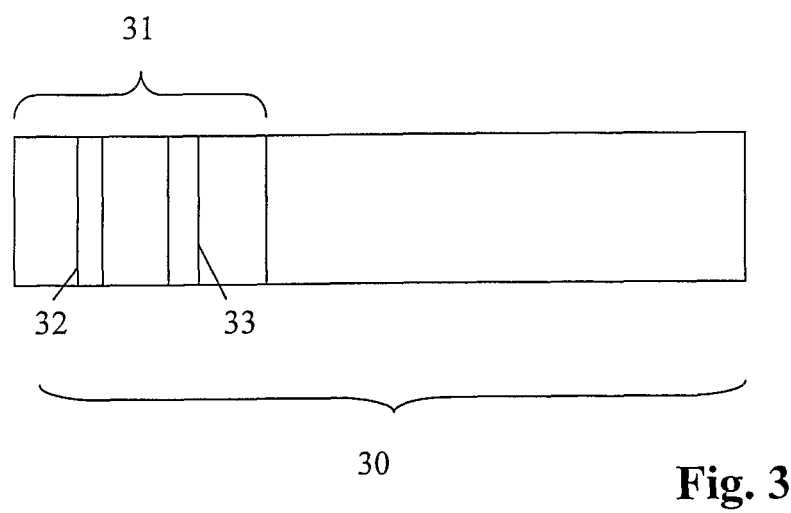
FIG. 3 shows a further example of a data unit carrying an identifying address and a forwarding address.

FIG. 3 shows a different scheme where a data unit 30 has a single header 31, which comprises a first field 32 for holding the identifying address IA and a second field 33 for holding the forwarding address FA.

In any case, the network nodes 101-112 are capable of appropriately reading the data units and identifying the respective addresses.

Figure 4:
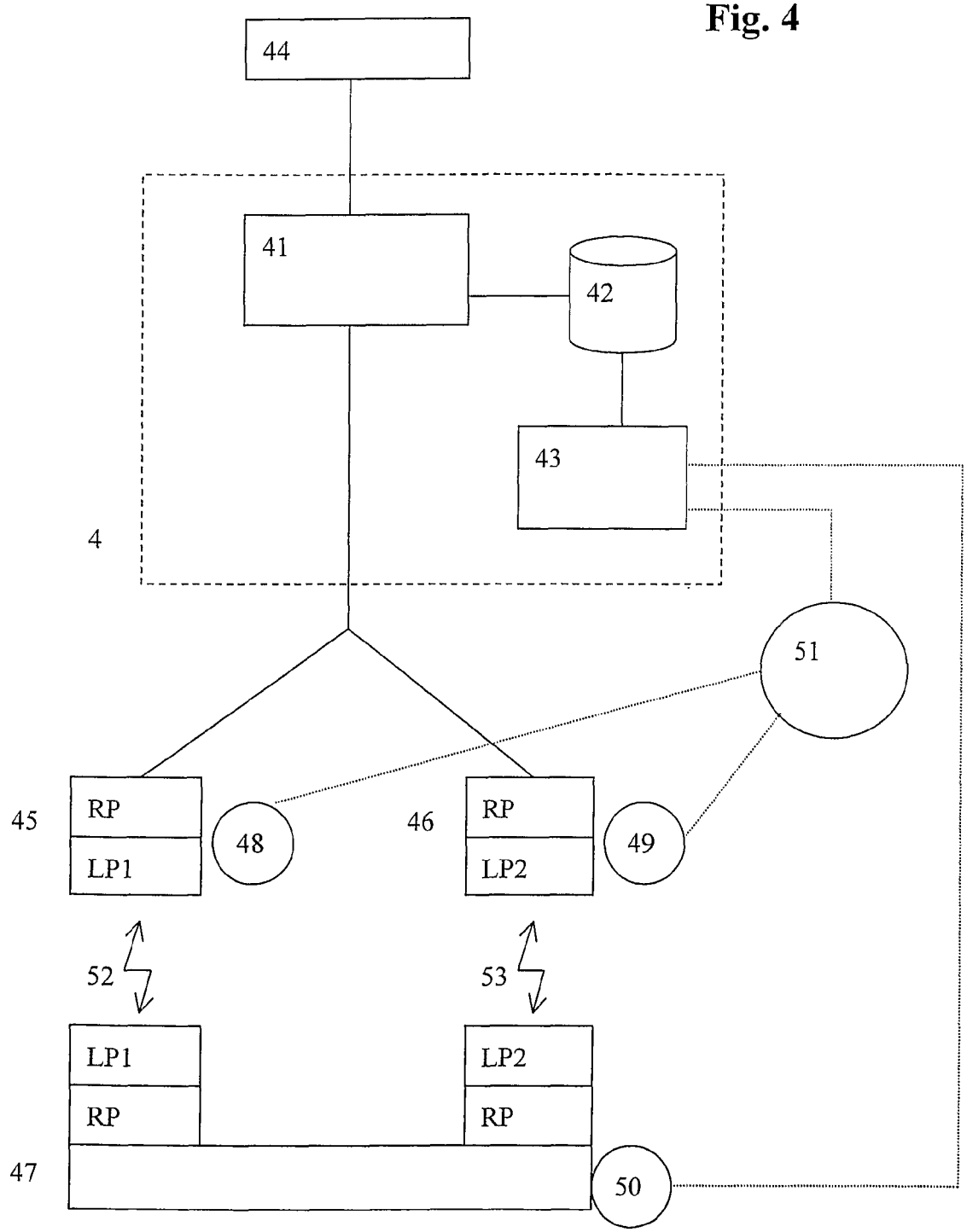
FIG. 4 shows a schematic block diagram of an embodiment of the invention.

FIG. 4 shows a schematic representation of an embodiment of the present invention. Reference numeral 4 relates to the data unit processing entity, which comprises a decision part 41, a decision data memory 42 and a management part 43. The decision part 41 is arranged to set a forwarding address FA in a received data unit that is to be forwarded. The operation of the decision part 41 depends on the identifying address set in the received data unit that is to be forwarded, and on the decision data stored in association with the given identifying address in the decision data memory 42. The decision data comprises one or more forwarding addresses FA, which the decision part may select.

The management part 43 is arranged to provide an interface to the decision data memory 42 for modifying the decision data stored therein. The interface is arranged to provide one or more mobile nodes access to the decision data memory 42 for updating the decision data. In the example of FIG. 4, reference numeral 47 represents a mobile node, which comprises a control function 50 capable of communicating with the management part 43, in order to modify the decision data stored in decision data memory 42. For example, the control function 50 can send update requests to the management part 43 indicating that the mobile node 47 would like to change from a forwarding address FA1 that is associated with radio link 52 to a different forwarding address FA2 that is associated with radio link 53. In the example of FIG. 4, reference numeral 45 relates to a first access node that mobile node 47 may employ and reference numeral 46 to a second access node that mobile node 47 may employ. Reference numeral 44 is a given node that sends RP data units to mobile node 47. For example, it can be a correspondent node in accordance with IPv6. The data unit processing entity 4 is an appropriate agent for identifying and inserting forwarding addresses. As such, it can be associated with a given node, such as the node 44, or it can be located at a specific node associated with the mobile node 47, i.e. as a type of home agent at the node that receives data units that only carry the identifying address IA of mobile node 47, such that these data units may receive a forwarding address FA that allows routing of the data units to the intended destination, i.e. mobile node 47.

Equally, the data unit processing entity 4 may be provided at a designated node of the network, i.e. a type of mobility anchor point, that is designated to handle data units that lack a forwarding address.

In the example of FIG. 4, the entities communicate at the level of the routing protocol RP, i.e. are peers of this protocol. As indicated, the access nodes 45 and 46 are also peers, but the underlying link protocol LP is different for the two different types of mobile access. For example, the link 52 can be governed by a link layer protocol for a mobile phone connection (e.g. for GSM, GPRS or UMTS), while link 43 may be governed by a link protocol for W-LAN.

In accordance with the present invention, the management part 43 furthermore provides an interface for a network control function 51, such that the network control function 51 can access the decision data in decision data memory 42 independently of any access provided to one or more mobile nodes, such as mobile node 47.

Function 51 can be any type of network control function, e.g. a radio resource management function for radio links. For this purpose, the network control function 51 can communicate with radio control functions 48, 49 that are respectively associated with radio links 52 and 53. In this way, the network control function 51 can e.g. be a multi-radio resource management (MRRM) function.

Such an arrangement has the particular advantage that a coordinating management of radio resources for different access technologies can be combined with the mobility management at the level of the routing protocol RP. It is noted that one of the decisive aspects of the basic routing at the level of the routing protocol RP is that it is independent of any particular underlying access technology.

In FIG. 4. the connections between the network control function 51 and the management part 43 is shown as a dotted line, just like the connections between the control functions 48, 49 and the network control function 51. The connections among the control functions and between a control function and the management part can be provided in any suitable or desirable way. In other words, they may make use of data units that adhere to the routing protocol RP, or the connections can be via separate, dedicated control signalling connections. In this way, the network control function 51 may be provided in one or more of the network nodes, or can be provided separately from the network nodes in a dedicated control architecture.

It is noted that although the control functions 48 and 49 shown in FIG. 4 communicate with the network control function 51, which in turn may access the decision data memory 42 via the interface of the management part 43, it is equally possible that the control functions 48, 49 directly communicate with the management part 43. This is shown in the embodiment of FIG. 8, which uses the same reference numerals as FIG. 4, such that a repeated description of the corresponding elements is not necessary.

Figure 8:
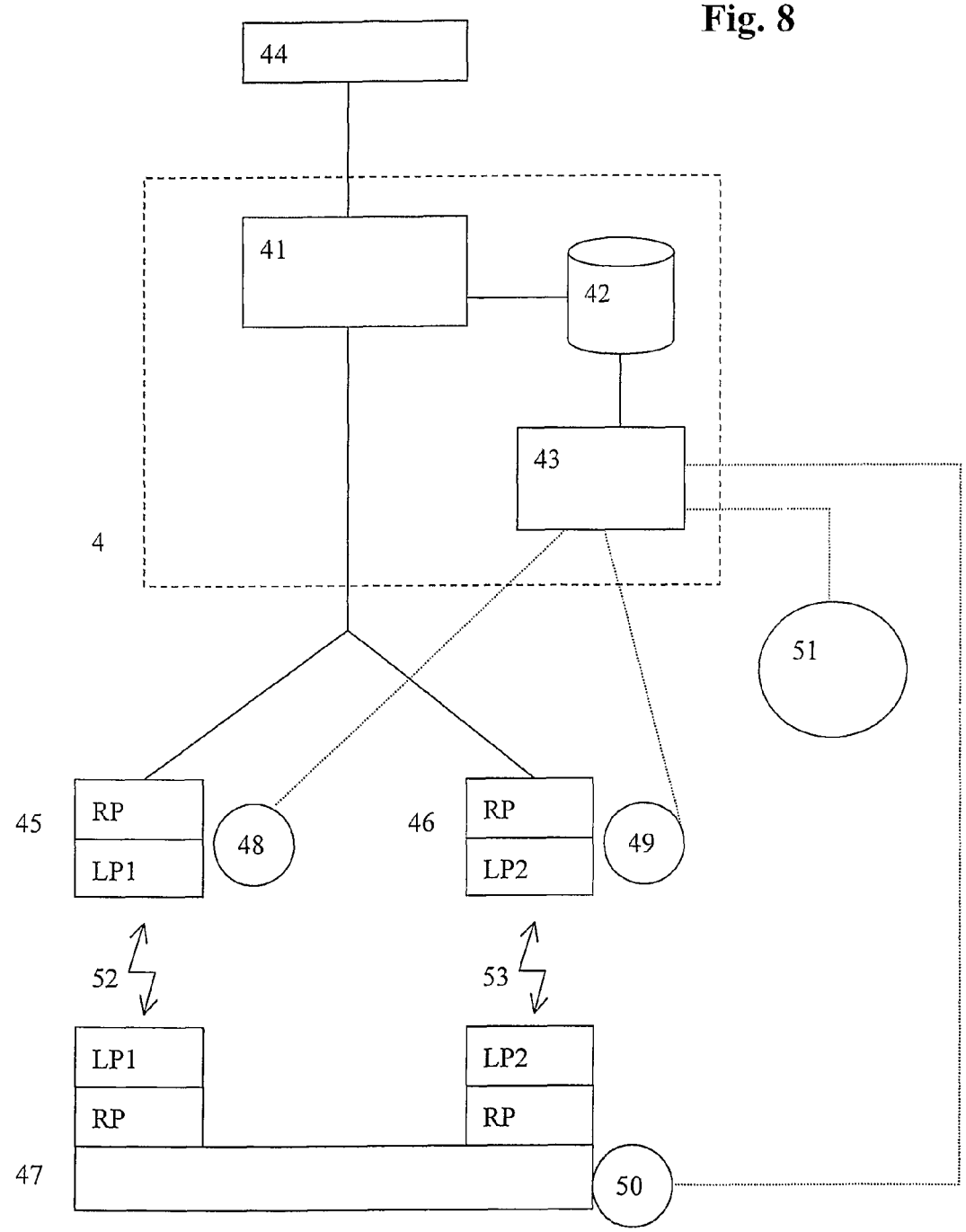
FIG. 8 shows a schematic block diagram of another embodiment of the invention.

In the example of FIG. 8, the control functions 48, 49, 50 and 51 each have independent access to the decision data. Therefore, each is involved in the decision procedure for determining forwarding addresses on the basis of an identifying address. This leads to a highly flexible decentralized control structure for the management of the forwarding addresses at the level of the RP.

In general, the data unit processing entity of the present invention is such that the interface provided by the managing part 43 provides a plurality of control functions with access to the decision data memory 42. One or more of this plurality of control functions may be located in one of the mobile nodes, such as the control function 50 located in mobile node 47.

Figure 5:
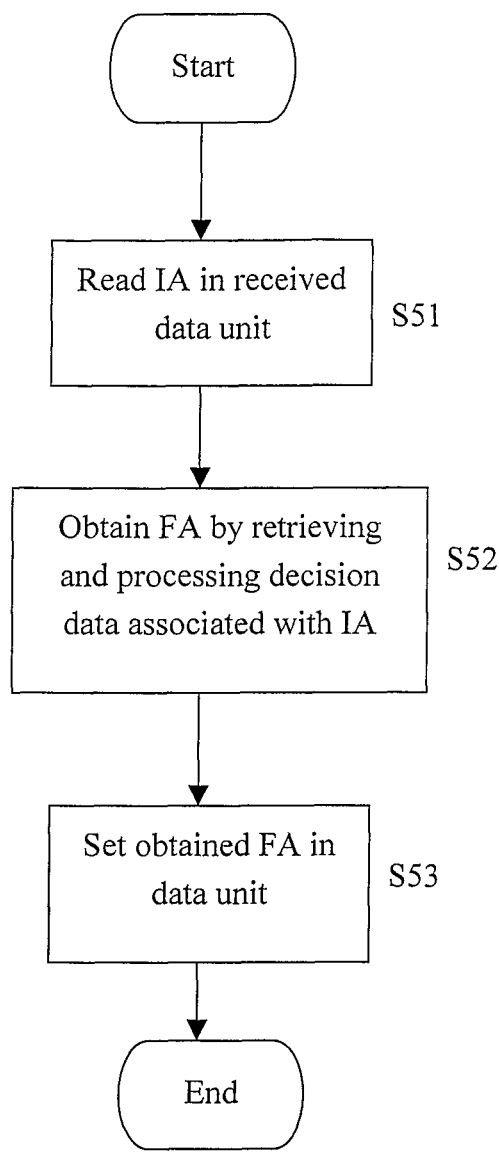
FIG. 5 shows a flow chart for describing an example of a decision procedure for setting a forwarding address on the basis of an identifying address.

FIG. 5 shows an example of a decision procedure setting a forwarding address in a received data unit that is to be forwarded. In step S51, the identifying address IA is read in the received data unit. Then, in step S52, the decision procedure looks into the decision data memory 42, in order to retrieve the decision data associated with the identifying address IA. The retrieved decision data is then processed to obtain a forwarding address FA. Finally, the obtained forwarding address FA is set in the data unit, see step S53.

It is noted that the decision data may have any suitable or desirable form. Preferably, the decision data comprises decision rules and decision parameters. These decision rules and decision parameters can be stored in association with an identifying address, e.g. in the form of tables referenced via the identifying address IA.

The decision rules can e.g. have a simple "if-then" form, such as "if the higher layer protocol is X, then select forwarding address FA 1" and "if higher layer protocol is Y, then select forwarding address FA 2". For example, X may stand for UDP and Y for TCP. Decision parameters can be values to which rules refer, such as "if data unit size is below parameter Z, then select forwarding address FA 1, else FA 2", where "parameter Z" is a variable that refers to a value stored in the decision data memory, and the management part 43 may allow the external control functions to update this parameter. Another example for rules is that they depend on such parameters as the data rate or delay along a given link, such as "if delay exceeds Th on link with FA 2, then set select forwarding address FA 3", where "delay" is provided by a control function associated with the FA 2 link, and Th is an adjustable threshold parameter.

The rules may also be more sophisticated, e.g. depend on one or more predetermined cost functions. A rule could then e.g. be "Set forwarding address such that Cost_function_A is minimum", where Cost_function_A is a predetermined cost function. The cost functions may evaluate "cost" in terms of one or more of monetary value, energy, network load, delay, throughput, data rate, quality of service (QoS), or any other suitable or desirable measure. Such measures may specifically be associated with link resources, and relate to time slots, codes, frequencies, carriers, transmission power, etc.

Rules may also depend on user behaviour, for example on the mobility behaviour of the user of a mobile node that is moving. If it is e.g. determined that a user is moving quickly or consistently, as measured by an appropriate parameter, then a rule could be present for avoiding the setting to a forwarding address that would require an expected handover very soon, e.g. a forwarding address associated with a microcell from which it can be expected that a fast moving user will soon exit. In other words, "if motion_parameter exceeds Th_m, then do not set FA 4", where motion_parameter represents a parameter that indicates the user's degree of motion, and Th_m is an adjustable threshold.

The access to the decision data memory may be such that only parameters can be updated, or only rules, but it is preferable that the access is such that both rules and parameters may be changed. For example, in the context of the example of FIG. 8, access could be such that the control functions 48, 49 only access and change parameters (such as e.g. delay and data rate values associated with their links), whereas control function 51 only accesses and amends rules. Control function 50 could in turn be allowed to access all rules, parameters that relate to the mobile node, but not parameters that e.g. relate to links 52, 53. This example provides the advantage of a control scheme in which the possibly very different time scales of different control functions are very simply integrated. Namely, the control functions 48, 49 will typically send update requests much more often than the mobile node, due to the possibly rapidly changing circumstances at these links. Nonetheless, this does not lead to any problems.

In summary, one or more of the multiple control functions with which management part 43 communicates, are network resource management functions, e.g. for managing radio resources.

Figure 6:
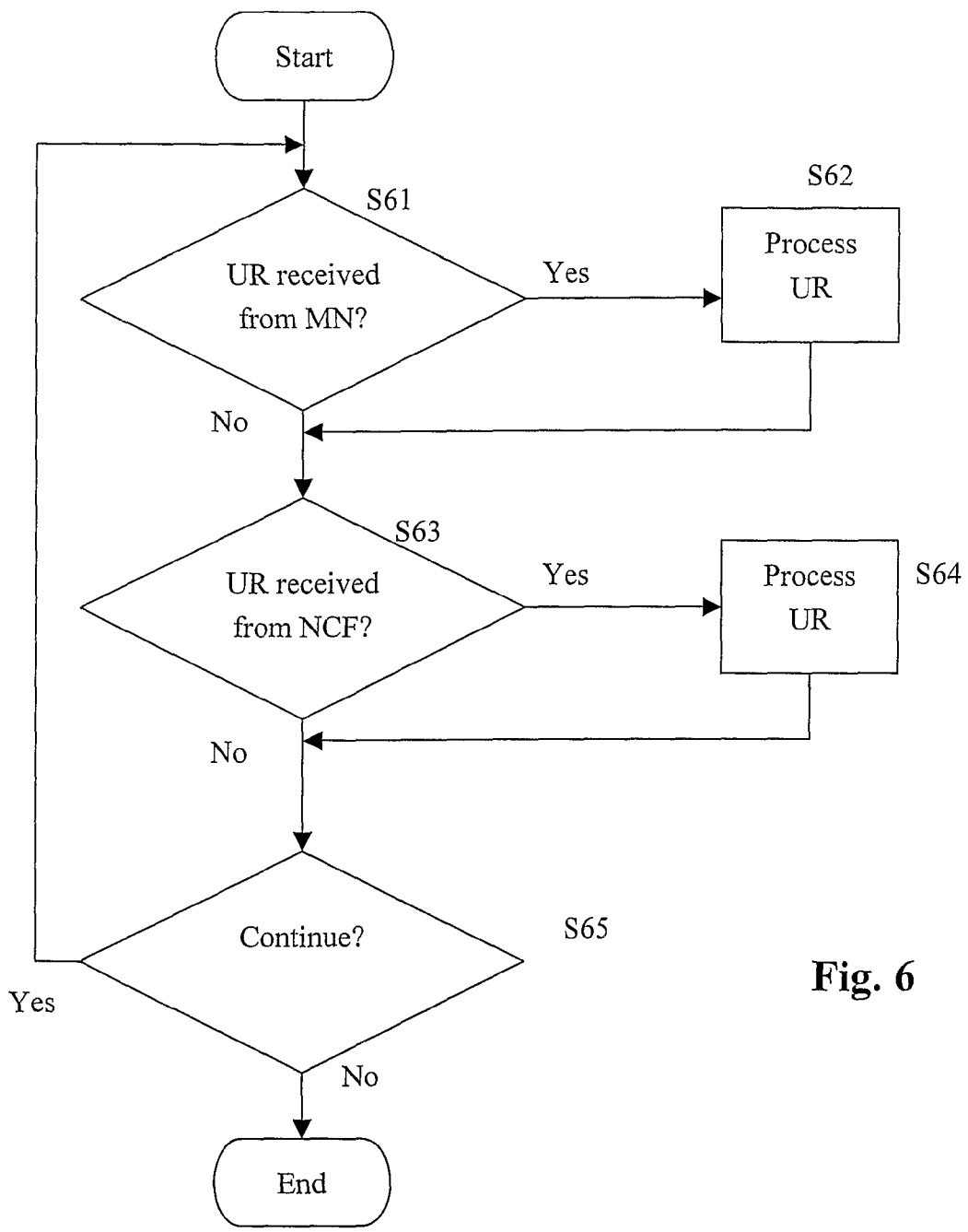
FIG. 6 shows a flow chart of an example of a management procedure for managing the decision data memory.
Figure 7:
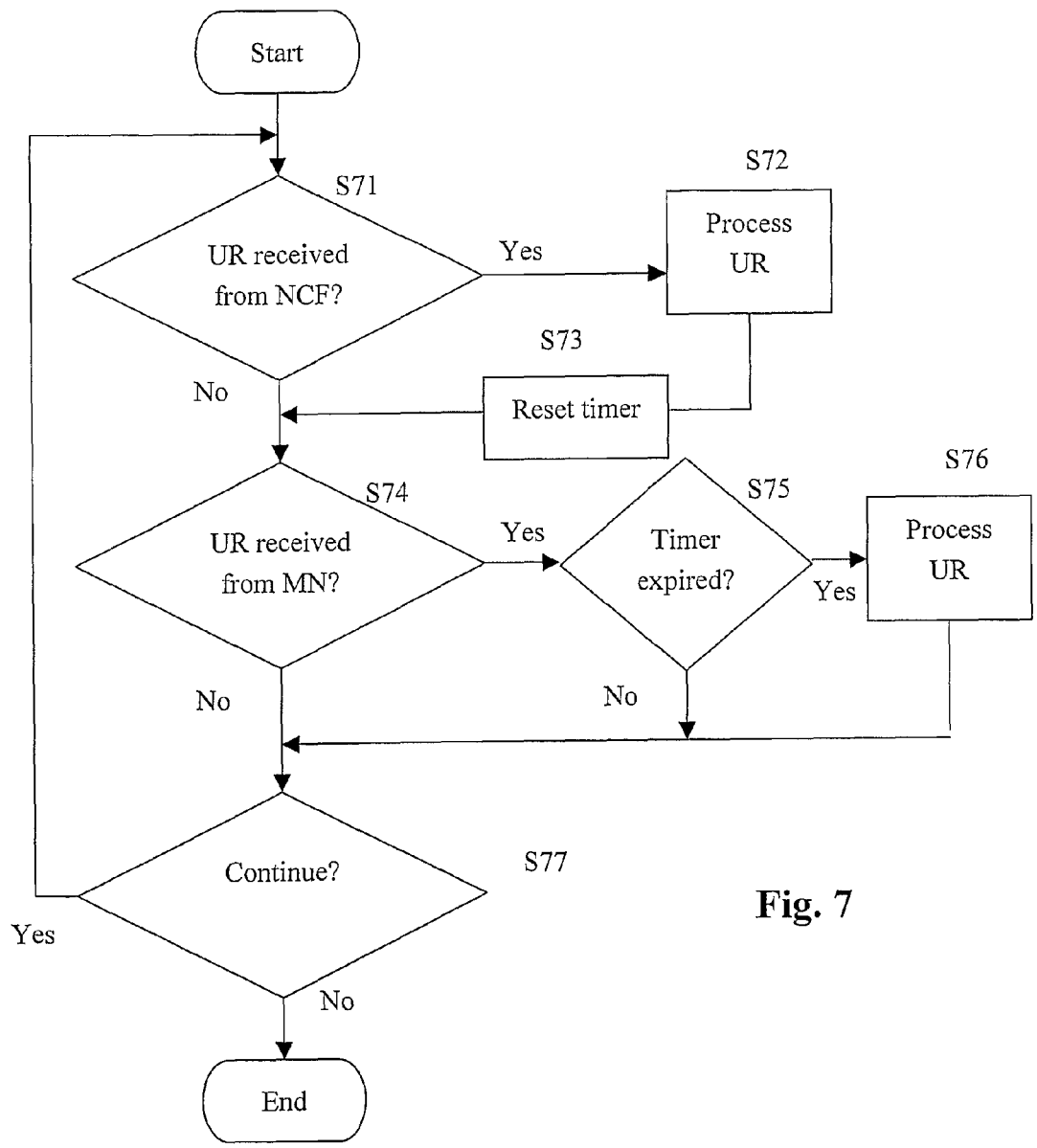
FIG. 7 shows a flow chart of a further example of a management procedure for managing the decision data memory.

FIGS. 6 and 7 show examples of management procedures for changing the decision data in the decision data memory 42. In FIG. 6, the procedure begins with step S61, in which it is determined whether an update request (UR) has been received from a mobile node (MN). Such an update request may originate from any of the control functions capable of communicating with the management part 43. If yes, then step S62 processes the update request, i.e. the updates requested are performed, e.g. one or more rules and one or more parameters are changed. The procedure then continues to step S63, in which it is determined whether an update request has been received from the network control function (NCF) 51. If yes, then this update request is processed in step S64. The procedure then continues to step S65, in order to either loop back to the beginning or to end.

As can be seen in the example of FIG. 6, the update requests for the decision data that are received from the mobile node (e.g. from the control function 50 at the mobile node) and from the networks control function 51 are handled independently of one another.

In the simple example shown in FIG. 6, both the mobile node and the network control function have full access, i.e. can update any rule or any parameter. However, it is also possible that the management part 43 restricts the access of one or both of the network control function and the mobile node. For example, it is possible that the network control function 51 receives full access, while the mobile node only receives access to certain parameters and/or certain rules. For example, the mobile node's access may be restricted to parameters that indicate user preferences and rules for "soft" decisions, but the mobile node does not receive any access to rules for "hard" decisions (such as mandatory handover decisions).

It is also possible that the access provided to different control functions receives different priorities. An example of this is shown in FIG. 7. The procedure of FIG. 7 starts with step S71, in which it is determined whether an update request has been received from the network control function 51. If this is the case, then the update request is processed in step S72. Subsequent to step S72, a timer is reset in step S73. The procedure then goes to step S74, in which it is determined whether an update request has been received from a mobile node. If this is the case, then step S75 determines whether the timer has expired or not. Only if the timer has expired will the procedure proceed to step S76, in which the update request from the mobile node is processed. Otherwise, step S76 is skipped. The procedure then continues to step S77, in order to either loop back to the beginning or to terminate.

Due to the use of the timer, the priority of the procedure is to process update request from the network control function 51, whereas update request from the mobile node (e.g. from the control function 50 of the mobile node) are only processed if sufficient time has passed since receiving the last update request from the network control function 51.

It is noted that the examples given in FIGS. 6 and 7 use update requests as an interface for accessing the decision data memory. However, the invention is by no means restricted to such a technique, as the interface may be provided in any suitable or desirable way.

It is furthermore noted that the update requests received from the network control function 51 will typically be more frequent than those received from the mobile node. This again underscores the aspect of independent access, and indicates one of the important advantages of the invention. Namely, by providing a plurality of independent control functions with access to the decision data memory, a highly flexible management of the decision data can be performed, e.g. in accordance with the possibly very different time scales relevant for the individual control functions. It is also pointed out that the access to the decision data memory 42 by the two control functions 51 and 50 as shown in FIG. 4 is only an example, and any number of control functions may have independent access to the decision data via the management part 43.

The decision part 41 and the decision procedure S51-S53 act dynamically to select a forwarding address FA from the decision data stored in decision data memory 42. Preferably, this dynamic selection is such that it is performed for each individual data unit to be forwarded. In other words, the decision procedure preferably does not operate for a group or block of data units at a time, but is performed individually for each received data unit that it is to be forwarded.

Although the present invention has been described by way of preferred examples, these only serve to convey to the skilled person a more complete understanding of the invention, but are by no means intended to be limiting. The invention is defined by the appended claims, where the reference numerals only serve to make the claims readable, but have no limiting effect.

What is claimed is:

1. A data unit processing entity in a data unit transmission network, said data unit transmission network associated with a plurality of network nodes, said plurality of network nodes including routing nodes and end nodes, said routing nodes being arranged to route data units over said data unit transmission network in accordance with a routing protocol, one or more of said end nodes being mobile nodes capable of accessing said data unit transmission network over more than one link, said network nodes being arranged to distinguish between a first type routing address and a second type routing address in said data units, said first type routing address serving to identify network nodes and said second type routing address serving to allow routing to mobile nodes, said data unit processing entity comprising:
a decision data memory storing decision data for associating one or more second type routing addresses for a particular first type routing address;
a decision part for receiving a data unit that is to be forwarded and for setting a second type routing address in said received data unit that is to be forwarded, an operation of said decision part depending on a first type routing address set in said received data unit that is to be forwarded and on said decision data stored in association with said first type routing address in said decision data memory;
a network control function entity for updating said decision data memory;
a management part further comprising:
a first interface to said decision data memory for modifying said decision data,
a second interface to one of said mobile nodes for allowing said mobile node to modify said decision data over said first interface, and
a third interface to said network_control function entity allowing said network control function entity access to said decision data memory for modifying said decision data and wherein said second interface and said third interface are two independent and separate interfaces to said management part.

2. The data unit processing entity of claim 1, wherein said decision data comprises decision rules and decision parameters, wherein said interface is arranged for modifying said decision rules and decision parameters.

3. The data unit processing entity of claim 1, wherein said decision part is arranged to dynamically select one of said second type routing addresses from said decision data.

4. The data unit processing entity of claim 3, wherein said decision part is arranged to perform said dynamic selection for each data unit to be forwarded.

5. The data unit processing entity of claim 1, wherein said third interface is arranged to provide a plurality of network control function entities with access to said decision data memory.

6. The data unit processing entity of claim 5, wherein one or more of said network control function entities are network resource management functions.

7. The data unit processing entity of claim 1, wherein said network control function entity is arranged to determine parameters related to access links over which said mobile nodes access said data unit transmission network, and to modify said decision data in dependence on said parameters related to access links.

8. A method of controlling a data unit processing entity in a data unit transmission network, said data unit transmission network associated with a plurality of network nodes, said network nodes including routing nodes and end nodes, said routing nodes being arranged to route data units over said data unit transmission network in accordance with a routing protocol, one or more said end nodes being mobile nodes capable of accessing said data unit transmission network over more than one link, said network nodes being arranged to distinguish between a first type routing address and a second type routing address in said data units, said first type routing address serving to identify network nodes and said second type routing address serving to allow routing to mobile nodes, said method comprising the steps of:
storing decision data for associating one or more second type routing addresses for a particular first type routing address;
utilizing a decision procedure setting the second type routing address in a received data unit that is to be forwarded, depending on the first type routing address set in said received data unit that is to be forwarded and on said decision data stored in association with said first type routing address in said decision data memory
utilizing a management procedure for said decision data memory, where said management procedure provides a first interface to said decision data memory for modifying said decision data, a second interface to one of said mobile nodes for allowing said mobile node to modify said decision data over said first interface and a third interface to a network control function entity allowing said network control function entity access to said decision data memory for modifying said decision data and wherein said second interface and said third interface are two independent and separate interfaces to said management procedure.

9. The method of claim 8, wherein said decision data comprises one or more decision rules and one or more decision parameters, and said interface is arranged for modifying said decision rules and decision parameters.

10. The method of claim 8, further comprising dynamically selecting one of said second type routing addresses from said decision data.

11. The method of claim 10, further comprising performing said dynamic selection for each data unit to be forwarded.

12. The method of claim 8, wherein said third interface provides a plurality of network control function entities with access to said decision data memory.

13. The method of claim 12, wherein one or more of said network control function entities are network resource management functions.

14. The method of claim 12, said network control function entity determining parameters related to access links over which said mobile nodes access said data unit transmission network, and modifies said decision data in dependence on said parameters related to access links.

* * * * *

UNITED STATES PATENT AND TRADEMARK OFFICE
CERTIFICATE OF CORRECTION

PATENT NO. : 8,904,035 B2  Page 1 of 1
APPLICATION NO. : 10/597960
DATED : December 2, 2014
INVENTOR(S) : Magnusson et al.

It is certified that error appears in the above-identified patent and that said Letters Patent is hereby corrected as shown below:

On the Title Page, in Item (56), under "OTHER PUBLICATIONS", in Column 2, Line 2, delete "Intertnet" and insert -- Internet --, therefor.

IN THE SPECIFICATION

In Column 6, Line 33, delete "FIG. 4." and insert -- FIG. 4, --, therefor.

IN THE CLAIMS

In Column 9, Line 64, in Claim 1, delete "network_control" and insert -- network control --, therefor.

In Column 10, Line 48, in Claim 8, delete "memory" and insert -- memory; --, therefor.

Signed and Sealed this
Sixteenth Day of February, 2016

Michelle K. Lee
*Director of the United States Patent and Trademark Office*